United States Patent
Juravicius et al.

(10) Patent No.: US 10,601,948 B1
(45) Date of Patent: Mar. 24, 2020

(54) SMART PROXY ROTATOR

(71) Applicant: metacluster lt, UAB, Vilnius (LT)

(72) Inventors: Martynas Juravicius, N. Utos eldership (LT); Eivydas Vilcinskas, Siauliai (LT)

(73) Assignee: metacluster lt, UAB, Vilnius (LT)

(*) Notice: Subject to any disclaimer, the term of this patent is extended or adjusted under 35 U.S.C. 154(b) by 0 days.

(21) Appl. No.: 16/669,149

(22) Filed: Oct. 30, 2019

Related U.S. Application Data

(63) Continuation of application No. 16/590,040, filed on Oct. 1, 2019.

(51) Int. Cl.
| | | |
|---|---|---|
| *G06F 15/173* | (2006.01) | |
| *H04L 29/08* | (2006.01) | |
| *H04L 29/06* | (2006.01) | |
| *H04L 12/24* | (2006.01) | |

(52) U.S. Cl.
CPC ............ *H04L 67/288* (2013.01); *H04L 41/14* (2013.01); *H04L 63/0428* (2013.01); *H04L 67/02* (2013.01); *H04L 67/141* (2013.01)

(58) Field of Classification Search
CPC ..... H04L 67/288; H04L 67/02; H04L 67/141; H04L 63/0428; H04L 41/14
See application file for complete search history.

(56) References Cited

U.S. PATENT DOCUMENTS

| | | | |
|---|---|---|---|
| 2016/0170814 A1* | 6/2016 | Li ........................... | G06F 9/542 |
| | | | 719/318 |
| 2018/0077624 A1* | 3/2018 | Jung ..................... | H04W 36/36 |
| 2018/0225387 A1* | 8/2018 | Pang .................. | H04L 67/2814 |
| 2018/0227210 A1* | 8/2018 | Cosgrove ................ | H04L 43/16 |

* cited by examiner

*Primary Examiner* — Richard G Keehn
(74) *Attorney, Agent, or Firm* — FisherBroyles LLP; Keats A. Quinalty

(57) ABSTRACT

The task, logic of HTTP/HTTPS session statistics interception and collection is moved to the client side instead of the proxy layer. Encrypted HTTPS tunnel is terminated at the client end, making the actual content or data in transit invisible to both proxies and the smart proxy rotator (SPR). Client's scraping software has a plug-in installed that expands its functionality. HTTP/HTTPS session quality metrics are intercepted and collected at the client side, then sent to the SPR. Proxy usage mark "can be used" is obtained from the SPR for the currently analyzed proxy, based on the results of metrics analysis.

20 Claims, 7 Drawing Sheets

SMART PROXY ROTATOR

CROSS-REFERENCE TO RELATED APPLICATION

This application is a continuation application of U.S. patent application Ser. No. 16/590,040, filed Oct. 1, 2019.

INCORPORATION BY REFERENCE

The disclosure of U.S. patent application Ser. No. 16/590,040, which was filed Oct. 1, 2019, is hereby incorporated by reference for all purposes as if presented herein in its entirety.

FIELD OF THE DISCLOSURE

The present embodiments relate to data processing equipment, a combination of two or more digital devices each having at least an arithmetic unit, a program and a register, e.g. for simultaneous processing of several programs. More specifically, the present embodiments relate to digital computing or data processing equipment and methods, specially adapted for evaluating statistical data and performing specific actions based on such evaluation.

BACKGROUND

Proxy servers are intermediate servers that accept requests from clients and forward the requests to other proxy servers, a source server, or service the request from their own cache. Proxy servers are computing devices connected to a network that serve as intermediaries for customer computing devices, requesting services or data from "network resources", accepting the requests from customers proxy servers and either forward the request to another proxy, redirect to the requested resource, or serve the request from their own cache, located locally or remotely, or distributed across multiple systems.

The proxy is also called 'server' or 'gateway'. A proxy allows users on a network to browse the Web, send files over File Transfer Protocol (FTP), and work with e-mail and other Internet services. A proxy basically does the following: i) receives a request from a client inside the firewall; ii) sends the request to the remote server outside of the firewall; iii) gets the response; and iv) sends the response back to the client.

The proxies can be divided into different types depending on what functions are provided or what servers are used. The proxies can also be divided into Residential Internet Protocol (IP) proxies, Datacenter IP proxies, and Mobile IP proxies. A Residential IP proxy is an IP address linked to a physical device, for example, mobile phone or desktop computer. The real owners of the Residential IP proxies, namely, Internet service providers (ISPs), register residential IP addresses in public databases, which allows websites to determine a device's internet provider, network, and location. Datacenter IP proxy is the proxy server assigned with a datacenter IP. Datacenter IPs are IPs owned by companies not by individuals. The datacenter proxies are actually IP addresses that are not located in a natural person's home. Instead, the datacenter proxies are associated with a secondary corporation. Mobile IP proxies act similar to residential proxies. A mobile IP proxy is essentially one IP address that is obtained from mobile operators. Mobile IP proxies use mobile data, as opposed to a residential proxy that uses broadband ISPs or home Wi-Fi. A proxy server is basically a computer on the internet with its own IP address that the client's computer knows. When a client sends a web request, the request goes to the proxy server first. The proxy server then makes the web request on the client's behalf, collects the response from the web server, and forwards the web page data so that the client can see the page in the browser. When the proxy server forwards the web requests, the proxy server can make changes to the data but yet provide the data requested. A proxy server changes the client's IP address, so the web server is not provided the geographical location of the client. A proxy can encrypt the client's data so that the client's data becomes unreadable in transit. Also, a proxy server can block access to certain web pages, based on IP address or domain name.

Modern proxy servers do much more than simply forwarding web requests. For example, modern proxy servers can perform several additional functions to increase data security and network performance. Proxy servers act as a firewall and web filter, provide shared network connections, and cache data to speed up common requests. Proxy servers can provide a high level of privacy. Proxy servers change the IP address and other identifying information the web request contains (e.g., so that the destination server doesn't know who made the original request). Proxy servers can also be used to control internet usage of employees and children (e.g., organizations and parents set up proxy servers to control and monitor how their employees or kids use the Internet) or improve browsing speeds and save the bandwidth (e.g., proxy servers can cache (save a copy of the appropriate website data locally) popular websites and when a request is made will send the saved copy to the client).

Proxies can be used to bypass certain Internet restrictions (e.g. firewalls) by enabling a user to request the content through a (remote) proxy server instead of accessing the content directly. Proxy servers are often used to get around geo-IP based content restrictions. If someone wants to get content from, for example a US webpage, but they do not have access from their home country, they can make the request through a proxy server that is located in the USA (and has a USA IP address). Using proxy services, the user's traffic seems to be coming from the USA IP address. Proxies can also be used for web scraping, data mining, and other similar tasks.

A proxy provider can control the quality of proxies and decide which Internet Protocol (IP) addresses are going to be served by a set of proxies used by clients. If the same proxy is used for too many requests, the proxy will ultimately be banned by the Internet service provider or the web page and it will not be possible to use such proxy to make subsequent requests. If too many requests come in from one IP address in a short period of time, then the site will return some sort of error message and disallow the requests from that proxy for a pre-set period of time. To prevent errors or disallowed requests, the proxies are rotated according to usage rate or other predetermined factors. The rotation is quick enough so that the target website server does not provide any errors and does not prevent using a proxy for additional requests.

While some systems operate individual proxies, managing lists of proxies and helping select an individual proxy for a particular user or user device for a prolonged session, these systems do not provide for an abstraction layer of proxies comprising a logical entity of a proxy provider, and managing proxy service access on a larger scale.

While some systems detect the proxy availability based on one or several requests occurring during a short period of time, these systems do not keep statistical information about the use of the proxies. Also, these systems do not evaluate proxies during longer periods of time and do not summarize proxy service quality and availability. Further, current rotation methods do not change the overall configuration of the proxy utilization.

For example, some proxies are evaluated taking into account several requests and listing the proxies from the most available to the least available. The process might be continuously repeated, but the overall statistics are not kept or measured. Also, according to changes in proxy availability and after the value of the proxy changes, the Web Browser needs to be periodically and dynamically updated with the "best" Proxy/Socks Server, so the proxy list needs to be updated constantly. Additionally, the prior art does not disclose the automatic collection of the statistical data and automatic configuration of thresholds without additional need for intervention. Also, the prior art systems require constant human supervision and intervention in summing up the generated data and changing the availability of proxies.

Further, the anonymity of the request or the privacy of the client making a request is not available. The traditional approach is to terminate the encrypted session within the domain of the proxy management provider, which compromises the privacy of the requests.

SUMMARY

In one aspect, the present embodiments use the same list(s) of proxies, and rotation of the proxy's provider disclosed allows the client to use the proxies in the most efficient manner. Through the present embodiments even if a narrow list of proxies is utilized, the present embodiments enable the client to use an automatic rotation system to use the proxies in the most effective way. The system disclosed in the present embodiments ensures that proxies are not exhausted (e.g., the exhaustion might occur when the proxy use limit reaches the threshold established by the provider). In another aspect, the present embodiments measure the providers' exhaustion rate at configured intervals and modifies providers' usage ratio.

The present embodiments prevent bulk blocking from exhausting the proxy pool of a provider thus deactivating, or disabling, the provider. Due to the constant collection and analysis of the service quality metrics of each client request, the Smart Proxy Rotator (SPR) is enabled to promptly intercept a higher blocking ratio of client requests serviced by a provider's proxies. The use of the SPR allows the utilization ratio of said provider to be lowered in a timely manner, thus preventing further blocking of IP addresses of the corresponding proxy pool and avoiding disabling the provider altogether. In case the provider has been blocked, all the proxies registered for a provider are placed on a pre-configured cooldown period, removing the proxies from active rotation. The proxies are returned to the active rotation after the cooldown period. Furthermore, detecting higher error/blocking rate SPR functionality allows for a temporal exclusion of the corresponding proxy pool from utilization for a pre-configured period of time. This temporal exclusion allows for the content provider to lower the error/blocking rate to get back to normal.

The present embodiments ensure a better quality of service for client requests. As a proxy rotator is collecting proxy service quality-related metrics of each client request, based on the analysis of said metrics, SPR dynamically adjusts the utilization of the provider thus avoiding using proxies with a higher error rate and ensuring a higher success rate for a client request.

In the present embodiments, the proxy service quality feedback is obtained from the client endpoint instead of the service provider's infrastructure. Thus, a client endpoint can safely use a proxy rotation service from an external provider without compromising security/privacy of the encrypted web session, which can occur by terminating the encrypted tunnel at points other than the client endpoint and the target web server.

Further, data within encrypted client requests at all times remains undecipherable both to the SPR and to the proxy serving the request. During an HTTPS session between the Web Scraper and the Target, all data, except the initial handshake, is placed in an encrypted tunnel and is only readable by the participants of the tunnel—namely, the Web Scraper and the target web server. In order to get the statistics of such encrypted sessions, within the presented embodiments the statistics is collected at a point where the tunnel is terminated, i.e. the data is decrypted.

The present embodiments provide for systems and methods for effectively managing proxy service by using a computer program that automatically rotates proxies and collects the statistical data of the availability of the proxies and adjusts proxy use according to the collected statistical data.

The present embodiments solve at least some of the following problems: a) collecting scraping session quality metrics for encrypted sessions without compromising the privacy of the session, e.g., without introducing a man-in-the-middle construct; b) increasing the service quality for the client requests due to proxy availability changing quickly and adjust configurations without manual intervention; c) preventing proxy providers from being disabled, due to their proxy pool exhaustion when all the proxies within the pool are banned.

BRIEF DESCRIPTION OF THE DRAWINGS

The following detailed description references the drawings, wherein.

DETAILED DESCRIPTION

Figure 1:
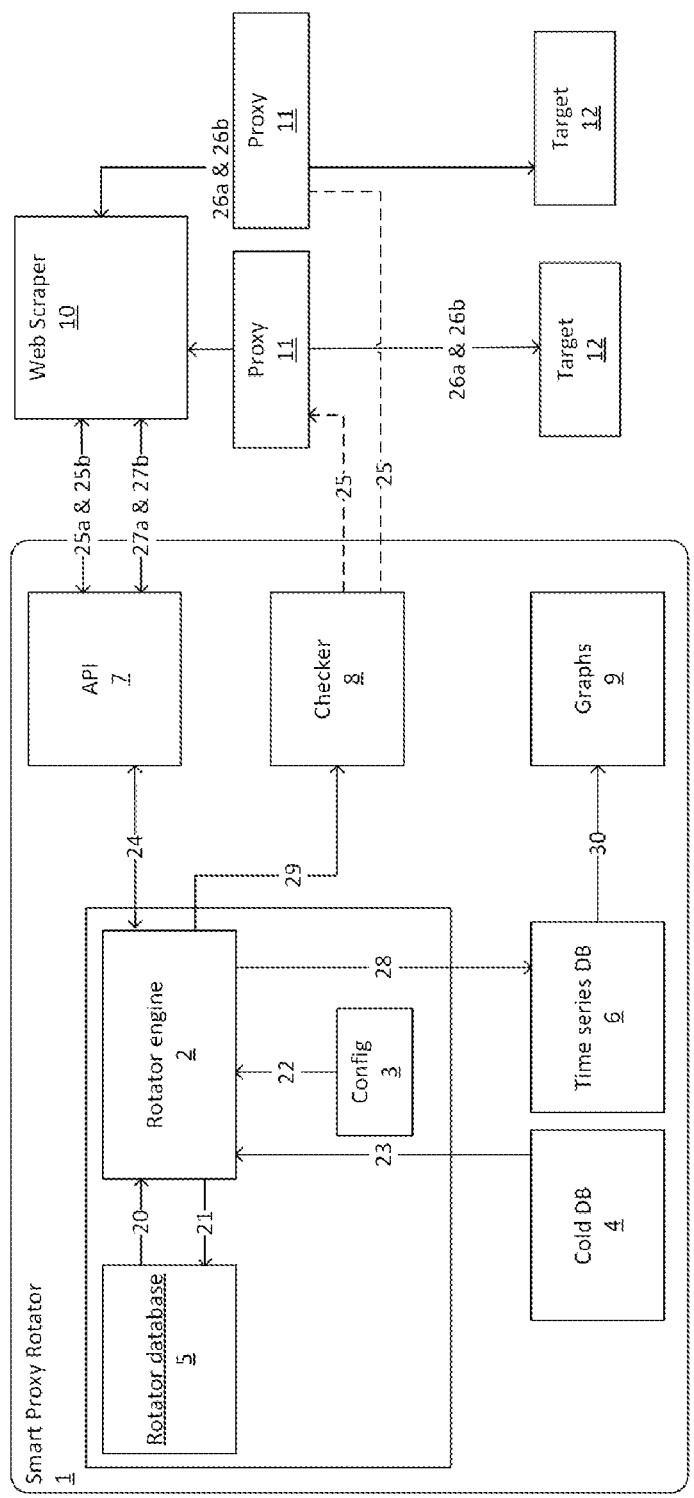
FIG. 1 is a component diagram that shows the overall architecture of the SPR 1 and context of at least one aspect of solution functions.

Some general terminology descriptions may be helpful and are included herein for convenience and are intended to be interpreted in the broadest possible interpretation.

The elements 1 through 9 are the comprising parts of Smart Proxy Rotator. The elements 10 through 12 are external systems.

1—"Smart Proxy Rotator" as a system coupled of separate components implementing a specific method and responsible for collecting statistical data, proxy control, rotation, maintenance, and reporting.

2—"Rotator Engine" is the component that analyzes proxy usage and chooses which proxy provider to use.

3—"Config" is a database where the SPR operational settings are stored (for example but not limited to proxy provider's weights, thresholds of error rates, other configuration settings). The database also can contain information about providers and targets, as well as settings associated with them or other relevant information. Config database is read by the Rotator engine 2 in order to collect operational settings contained therein (at step 22 of FIG. 1).

4—"Cold DB" is a database where the components that contain information about proxies with their configuration attributes are stored.

5—"Rotator Database" is a structured data system that is contained within a data storage device e.g. computer disk or computer memory. The Rotator Database is populated with data from "Config" 3 and "Cold DB" 4 during the start of SPR and ensures fast access to operational settings and proxy information.

6—"Time-Series DB" is a structured data system for storing and serving event records through associated pairs of time(s) and value(s). In many cases, the repositories of time-series data utilize compression algorithms to manage the data efficiently.

7—"API", or Application Programming Interface of SPR 1, is the component that is responsible for SPR communicating with external systems. The two methods enabled by the API are providing a proxy 11 to the web scraper 10 and accepting feedback about the proxy 11 from the web scraper 10. API provides the entire communication received from Web scraper 10 to Rotator engine 2 (at step 24 of FIG. 1).

8—"Checker" is the software that checks a disabled provider's proxies and signals the Rotator Engine 2 to include the proxy in the rotation when the proxy is back online (if applicable).

9—"Graphs" is the component producing real-time graphs from time-series records records, used for real-time status dashboards as well as reporting.

10—"Web scraper" is an at least partly automated computer program or script that gathers data or content from a network for the purpose of replicating content or for data analysis. Web scraping software uses the Hypertext Transfer Protocol, HTTPS, FTP or other protocols, directly accessing the web resources or employing a proxy as an intermediary.

Scraping network content involves fetching content and extracting or gathering or gathering data from the content. Fetching is the downloading of information (as an example, as an example, a browser downloads content when content is viewed on the web page) including the plethora of objects the target contains. The content that is scraped may be parsed, searched, or reformatted, and the content's data is or can be copied into a spreadsheet and/or similar actions are or can be performed.

11—"Proxies" or "Proxy"—a proxy server (a computer system or an application) opened for the client connection, that acts as an intermediary for requests from clients seeking resources from other servers. A client connects to the proxy server, requesting some service, such as a file, a connection, a web page, or other resources available from a different server. The proxy server evaluates the request for content and forwards the request through the actual target resource, or resources, containing the actual content. After obtaining the content, the proxy server normally forwards the content to the original requestor, but other actions by the proxy (eg. return error message) can also be performed. Depending on the type of request, a proxy server may or may not have full visibility into the actual content fetched for the original requestor, e.g., in case of an encrypted HTTPS session, the proxy may serve as an intermediary, blindly forwarding the data without being aware of what is being forwarded.

"Proxy Provider"—the party providing the actual proxy as a service. Proxy services shall mean any proxy server that acts as an intermediary for requests from clients seeking resources from other servers. One of the many available typologies being the type of IP address the proxy uses, including but not limited to Residential IPs proxies, Datacenter IP proxies and Mobile IPs proxies.

13 "Target" or "Target server"—a web server serving the content accessible through HTTP/HTTPS protocols.

"Client"—a person or a business entity that is requesting and using SPR for the purpose of obtaining proxies connectivity information.

"Device" or "Processing Device"—a cloud server, a mainframe, a notebook, a desktop, a tablet, a workstation, a mobile device, or any other electronic device.

"DB"—a database.

"Network"—a digital telecommunications network that allows nodes to share resources. Examples of a network: local-area networks (LANs), wide-area networks (WANs), campus-area networks (CANs), metropolitan-area networks (MANs), home-area networks (HANs), Intranet, Extranet, Internetwork, Internet.

In one aspect, the present embodiments include a system and a method for effectively managing proxy service quality. Those of ordinary skill in the art will realize that the following detailed description of the present embodiments is illustrative only and is not intended to be in any way limiting. Other embodiments of the present system(s) and method(s) will readily suggest themselves to such skilled persons having the benefit of this disclosure. Reference will now be made in detail to implementations of the present embodiments as illustrated in the accompanying drawings. The same reference indicators will be used throughout the drawings and the following detailed description to refer to the same or like parts.

Figure 4:
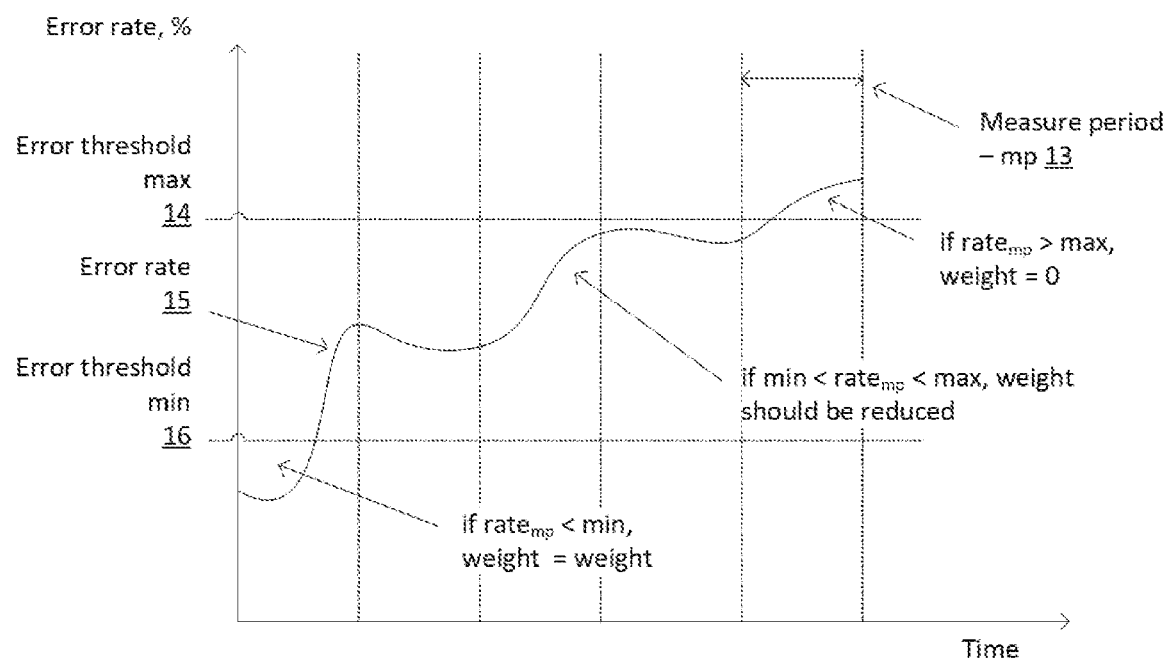
FIG. 4 is the demonstration of the decision algorithm that helps decide when a provider's utilization priority, or weight, should be changed.

One of the features of a smart proxy rotator (SPR) 1 is to balance proxies 11 in the list and prevent the proxies from going down when the proxies are over-used or the Error rate 15 is increased. As one goal is not to exhaust the proxy list of a particular provider (i.e. not to disable all usable proxies) when the targets start rejecting the ongoing requests from the same proxies. The SPR 1 measures the provider's quality rate (including, for example, how often the proxy is used, if the proxies return the requested content to the client, if the proxies are available for use, and similar qualities) at configured intervals and lowers one provider's usage while increasing other provider or providers usage according to their weights. Quality rate is measured periodically and can be measured at any selected intervals (no limitations exist of the interval rate). The measurement interval (or measure period 13) length is set in the target configuration (Example Table 2, line 4). There are also proxy exhaustion thresholds set for every provider (Example Table 2, lines 10-19). While being activated, the SPR 1 configures the proxy provider's state as being Normal or Not Normal. When the proxy exhaustion rate stays below a minimum (min) threshold, the provider is treated as if it is in the Normal state and can operate at the weight set in the Configuration (Config 3). When the maximum (max) value is reached, the SPR 1 stops using the provider and changes the provider's state to Not Normal. Then the SPR 1 stops using the provider for the period set in the (Config 3, Example Table 2, line 14) and starts using the provider again when the exhaustion rate drops below the min threshold again. When the exhaustion rate is between min and max threshold values, the SPR lowers the usage weight according to the exhaustion rate (FIG. 4).

Another type of errors that influences proxy provider utilization are proxy unavailability incidents e.g. network errors or processing errors. Then SPR 1 does not give these proxies to the Web Scraper 10 and disables the provider as soon as the Error threshold max 14 is reached. SPR 1 has an internal component Checker 8, which immediately starts checking the provider's availability and revives the provider to be available for use as soon as possible if the provider becomes available again.

In the SPR 1 system and method, the Rotator database 5 is responsible for storing, collecting, and changing the weights of each provider. Every provider should have an initial weight set in every target Config 3 (Example Table 2, line 8). The initial configurations can be set up individually by each client, or can be provided by the provider of proxies. As every provider can only support a certain number of concurrent connections, the SPR 1 counts how many provider's proxies are served to the Web Scraper 10 and have not returned feedback. Because the count of a provider's proxies is close to the maximum number of concurrent connections, if this count reaches max concurrent connections, the SPR 1 does not allow increasing the proxy provider's usage weight anymore and, instead, decreases usage of the proxy provider. The SPR 1 can even direct the Web Scraper 10 to stop using a provider's proxies in order to reduce the provider's usage.

For some targets, the Web Scraper 10 uses the same proxy to send several requests for content e.g. to obtain a few Web pages from a target web server, or any other kind of content in the network, in order to get the data without provoking blocking mechanisms.

The proxy's capability to serve several requests before rotation is declared by an attribute assigned to the proxy provider this proxy belongs to. The attribute is defined within the provider's configuration parameter "is_static" (Example Table 1, line 4). If the functionality is available, SPR 1 can use the same proxy 11 for several requests with the same Target 12. If this function is not available, for each and every request, the SPR 1 uses different proxies to reach the Target 12. In the disclosed embodiment the functionality is marked by a parameter "is_static", while any other term can be used to indicate the functionality.

The typology of the proxy relevant for the present solution, can be comprised of, but is not limited to, the type of outbound IP address (e.g., many-to-one: static single outbound IP address, or dynamically assigned single outbound IP address; or many-to-many: rotating pre-defined pool of outbound IP addresses).

In one aspect, one goal of the SPR 1 is to balance usage across the multiple proxy providers defined for a particular customer, according to the provider's weights defined within the currently active configuration settings. One of the usage examples can be the following: if one provider has a weight equal to 10, and the other provider has a weight equal to 20, the proxy rotator should use the second provider 66.6% of the time and the first provider 33.3% of the time, when no changes to the default providers' weights have been introduced. These percentages are the utilization thresholds of each provider. The SPR 1 measures the bandwidth, availability, and use of each provider and reacts to proxy usage feedback by automatically configuring and changing the weights.

By evaluating the provider's weights, the SPR 1 selects an individual proxy 11 from the provider's proxy pool in an appropriate fashion, for example, round-robin. Alternative methods, for example, could be, but are not limited to, random or least utilized. Through API 7, the SPR 1 passes the proxy 11 information to the client. The attributes included within the information passed can be, but are not limited to: proxy id, port to connect to, authentication credentials, country, is_static attribute on/off, HTTP/HTTPS protocol, or other attributes.

Figure 2:
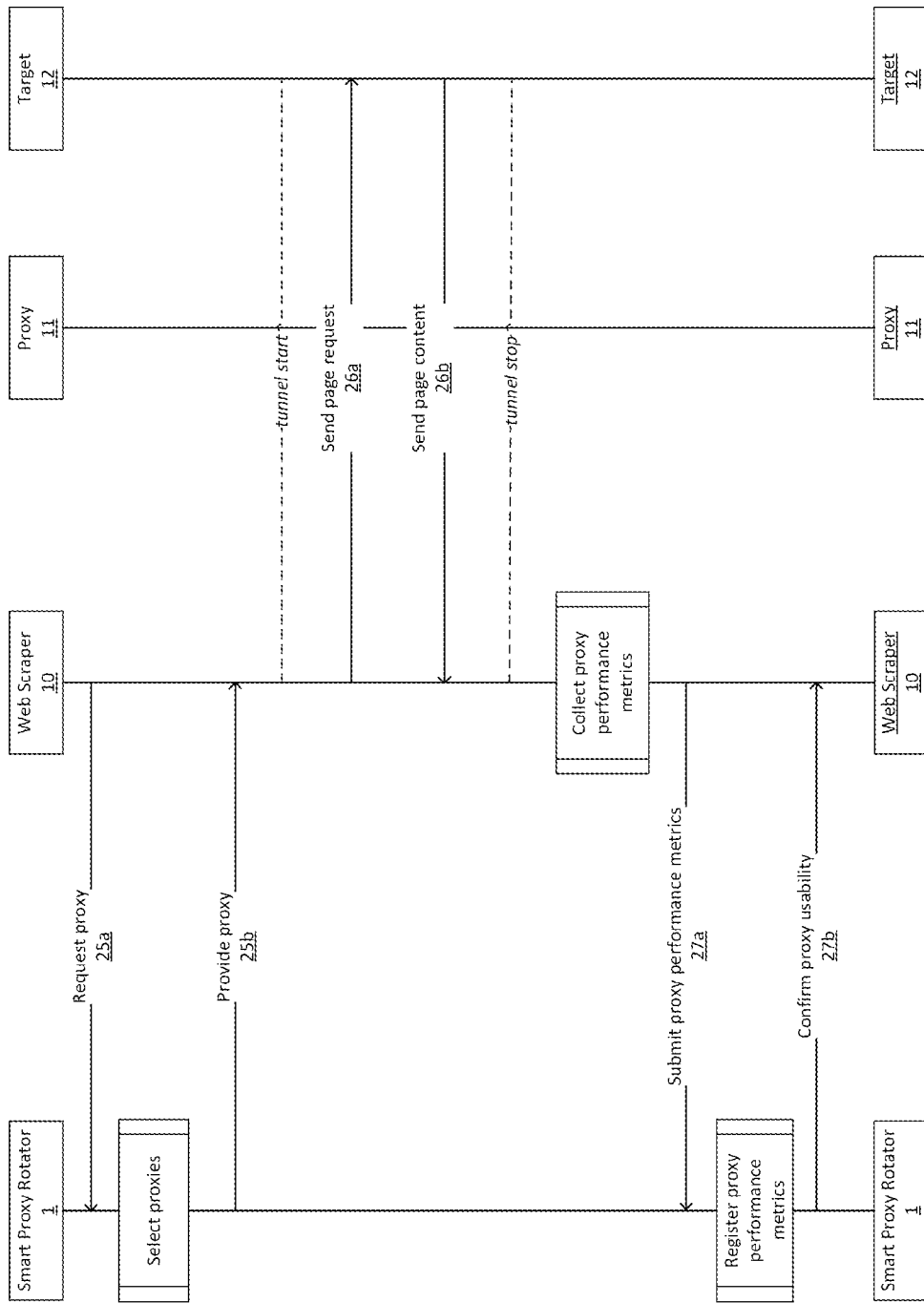
FIG. 2 is a sequence, or flow, diagram, describing two exemplary use-cases for SPR 1.

FIG. 1 illustrates the architecture of the system in accordance with one or more embodiments generally. FIG. 2 shows a schematic representation of the two primary functionalities of SPR 1. The first use: SPR 1 accepting a request for a proxy from a client's Web scraper, selecting a proper proxy according to the currently valid operational settings, and sending the proxy connectivity information to the client. The operational settings are configured manually before the SPR starts. SPR operational settings can be, but are not limited to, proxy provider's weights, thresholds of error rates, captcha measure period, providers block threshold, provider's rest period, provider's revive rate, cooldown period, provider's disable date, provider's available functionality (e.g. "is_static" parameter), traffic limits, max concurrent connections limits, other configuration settings. The second use: SPR 1 periodically aggregating the statistical data on proxy service quality accumulated within "In-memory Database", calculating the overall service quality metrics for each provider, comparing the resulting values with the thresholds currently configured for said provider or providers, and updating the provider's utilization threshold within "In-memory Database".

In one embodiment, a client is provided beforehand, through any channels available, performance metrics collection code to integrate into the Web Scraper 10 software. The client integrates the code into the Web Scraper 10 application as a prerequisite for the metrics collection to function before client requests to SPR 1 occur. The code can be integrated into any available Web scraper 10 that can use the built-in data, image, document extractors, and editors for custom Web scrapers and automatic exploration and extraction jobs or similar tools. The code can be integrated into a web scraping application as a plug-in that adds a specific Rotator engine's 2 feature to an existing application, downloaded together with the relevant API 7, or installed in other available ways.

Once installed, SPR 1 starts, reads the Config 3 file on the disk (step 22 shows operational settings reading from the Config file on disk), connects to the Cold DB 4 (step 23 shows the proxy list reading from the Cold DB on disk), and populates Rotator Database 5 with proxy and provider details from these two sources. These steps can be taken simultaneously by SPR 1 or sequentially, one step after another. Once initiated, SPR 1 also connects to the statistics/ reporting DB (Time series DB 6). SPR 1 is also ready for communication with external systems, such as clients' Web scraping software.

The use of the SPR 1 begins with the Client's Web scraping 10 software connecting to SPR 1 making a web scraping or other data gathering request. Web Scraper 10 contacts SPR 1, requesting a proxy for every request for the target content, e.g. a web page. The process further comprises: SPR 1 accepting a request for a proxy from a client's Web scraper 10 (step 25*a*), selects a proper proxy and sends the connectivity information to the client (step 25*b*).

The request specifies the eligibility criteria for the proxy to be appropriate for the request. The process of SPR 1 serving a request for a proxy is comprised of the steps of: 1) SPR 1 accepting the request (step 25*a*); 2) SPR 1 evaluating the eligibility criteria provided by the client; 3) SPR 1 selecting the proxy provider according to the currently valid target configuration, e.g., provider utilization priorities (weights) and proxy eligibility criteria; 4) SPR 1 selecting the proxy from within the selected provider using any available algorithm (e.g., a round-robin fashion or an alternative algorithm appropriate). The algorithm and the 'max_concurrent_connections' parameter in provider's Config 3 (Example Table 1, line 23) allows the SPR 1 to evenly distribute and control the subnet/provider load); 5) SPR 1 sending the selected proxy's identification and connectivity information to the client's Web scraper 10 (e.g., but not limited to: identification, IP address, TCP port, credentials, type of proxy, country, multiple sessions support, HTTP/HTTPS protocols support (step 25*b*)); 6) Web scraper 10 using the proxy to perform a request (step 26*a*) and obtaining the target data through the provided proxy (step 26*b*); 7) Code within the Web scraper 10 intercepting the relevant quality/performance metrics for the abovementioned proxy session and collecting the performance and availability information of the proxy; 8) Web Scraper 10 sending the performance and availability information of the proxy performance and availability information of the proxy to SPR 1 (step 27*a*); 9) SPR 1 registering the obtained performance and availability information of the proxy within the Rotator Database 5; 10) correcting the utilization threshold if the threshold needs to be changed according to the gathered data; and 11) confirming the proxy usability after these steps (step 27*b*).

A description of the quality metrics analysis and dynamic modification of SPR 1 operations settings, such as proxy providers' utilization threshold, is comprised of the following steps: 1) SPR 1 periodically aggregates the statistical data and performance and availability information on proxy service quality accumulated within the Rotator Database 5; 2) calculating the overall service quality metrics for each provider; 3) comparing the resulting values with the utilization thresholds currently configured for said provider or providers; and 4) updating the provider's utilization threshold within the Rotator Database 5 (step 21 shows updating operational settings in the in-memory data structure). All subsequent requests for proxy will be evaluated and served against these values (step 20 shows reading operational settings from the in-memory data structure).

The analysis can trigger changes for a particular proxy provider or proxy server or proxy server configuration within a target's settings, modifying the load directed at the provider, e.g., reducing or increasing the utilization threshold relative to other providers or disabling the provider.

Among the multiple criteria for defining a provider's status and eligibility for the task are, but not limited to: hard coded dates for the provider' service start and finish; traffic limit; concurrent sessions limit; multiple sessions per proxy support.

The criteria defining proxy eligibility for a particular request include, but are not limited to: proxy id, proxy status, proxy response time, the size of data transferred. Proxy status indicates what happened after one use of a proxy. Possible values can be, but are not limited to: ok, captcha, connection error, proxy error, server error, timeout etc. Size of data indicates a number (in bytes), of how much data was downloaded with a particular proxy. Response time indicates the amount of time between sending out a request and receiving a complete response with the used proxy.

The following is an example of a provider's settings within Config 3.

Example Table 1.

```
 1   {
 2       'provider_1': {
 3           'disable_date': '2019-12-12 12:12:12',
 4           'is_static': True,
 5           'scan_locations': True,
 6           'traffic': {
 7               'limit': 40 # Number in terabytes.
 8               'start_date': '2019-12-01 12:12:12',
 9               'end_date': '2019-2-29 12:12:12',
10           },
11           'max_concurrent_connections': 200,
12           'subnet_exists': True,
13       },
14       'provider_2': {
15           'disable_date': '2019-12-12 12:12:12',
16           'is_static': True,
17           'scan_locations': True,
18           'traffic': {
19               'limit': 40 # Number in terabytes.
20               'start_date': '2019-12-01 12:12:12',
21               'end_date': '2019-2-29 12:12:12',
22           },
23           'max_concurrent_connections': 200,
24           'subnet_exists': False,
25       },
26   }
```

In a similar fashion the web page targets, or targets to gather any other content from a network, can be described as follows: 1) protocols supported: HTTP/1.1, HTTP/2; 2) providers eligible for the target, with per provider parameters: the initial hard coded utilization priority, or comparative weight, of the provider; 3) time period for measuring error, blocking rate blocking thresholds (min/max); 4) (Error threshold min 16, Error threshold max 14); and 5) cooldown periods for when Error rate 15 reach their maximum thresholds 14.

The following is an example of a target's settings within Config 3:

Example Table 2

```
 1   {
 2       'target_1': {
 3           'http_protocols': ['HTTP/1.1', 'HTTP/2'],
 4           'captcha_measure_period': 35,
 5           'error_measure_period': 30,
 6           'providers': {
 7               'provider_1': {
 8                   'weight': 10,
 9                   'blocks': {
10                       'blocks_threshold': {
11                           'min': 10,
12                           'max': 45,
```

-continued

Example Table 2

```
13              }
14              'rest_period': 300,
15              'revive_rate': 20, # percent
16          }
17          'error_threshold': {
18              'min': 50, # percent
19              'max': 80, # percent
20          }
21          'cooldowns': {
22              'captcha': {
23                  'scope': 'subnet'
24                  'period': 3600,
25              }
26          }
27        }
28      }
29    }
30  }
```

The following supporting functionalities are supported by multiple SPR 1 components.

Service quality dashboards and reporting are relying on Time series DB 6 and Graphs 9. The Time series DB registers proxy service utilization events related to the moment in time (step 28). Graphs component connects to the Time series DB to obtain the time-series records in order to generate the reporting graphics (step 30). The reporting graphics visualize the following not-limiting list of reports: a) which providers the target is using; b) number of proxies the provider has; c) number of proxies per provider that are in cooldown; d) captcha rate by target and provider; e) error rate by target and provider; f) default and current provider weights; g) response time by target and provider; h) traffic used per provider; and i) location information of the provider's proxies. SPR 1 also has the ability to scan proxy location as a parallel task, not interfering with the main proxy rotator functions. The proxy location is typically scanned for those providers which have the 'scan_locations' parameter set to 'True' in provider config (Config 3, see Example Table 1 Example Table 1T, line 5). Some providers, such as many residential providers, do not have static IP addresses, so location scanning is not performed. The location is scanned when new proxies are added or once a month when IP location databases update their records.

The SPR can cool down individual proxies or the whole subnet of proxies for a period of time, depending on whether a proxy was blocked or an error was received or a proxy was exhausted in any other way. Subnets are typically cooled down if the 'subnets_exists' parameter is set to 'True' (Example Table 1, line 12) and the 'scope' parameter is set to 'subnet' (Example Table 2 line 23).

The SPR 1 counts the traffic within a given period and disables the provider if the limit is reached or notifies when the limit is about to be reached. This is achieved with Web scraper's 10 ability to send a 'size_download' (API 7 in FIG. 3B) metric (how much traffic was used with a certain proxy) and the parameters in the provider config (Config 3, Example Table 1 line 18). The 'limit' parameter (Example Table 1, line 19) can be set up measuring any computer storage capacity (such as up measuring any computer storage capacity (such as terabytes, bytes or other units), bytes or other units). The 'start_date' and the 'end_date' (Example Table 1, lines 20-21) sets the time range for the limit.

The analysis of the aggregated statistical information can be not only reducing/increasing the use of the proxy/proxy provider but also: SPR 1 putting a proxy or whole subnets on "cooldown" due to a high error/blocking rate. The time interval for such cooldown is defined within the configuration per provider, and can be any selected time interval (seconds, minutes, hours etc.). After the designated time period has passed, SPR 1 changes the configuration again activating the proxy/proxy subnet, making them available to clients.

SPR 1 disabling the provider due to high connection error and timeout rate. When a particular provider's proxies demonstrate a high connection error and timeout rate SPR 1 may disable the provider, removing the proxies from rotation.

Immediately after disabling the provider a separate SPR 1 component, Checker 8, starts continuously probing the connectivity to the provider's proxies. When the check is successful, the provider is activated and proxies start to be given to clients again. In order to avoid a huge error load when a provider stops working, the 'disable_date' parameter in the proxy provider's configuration (Config 3, FIG. 4A, line 3) is used. This will disable the proxy provider and send a notification that the provider's service was disabled by the expiration date.

Figure 3A:
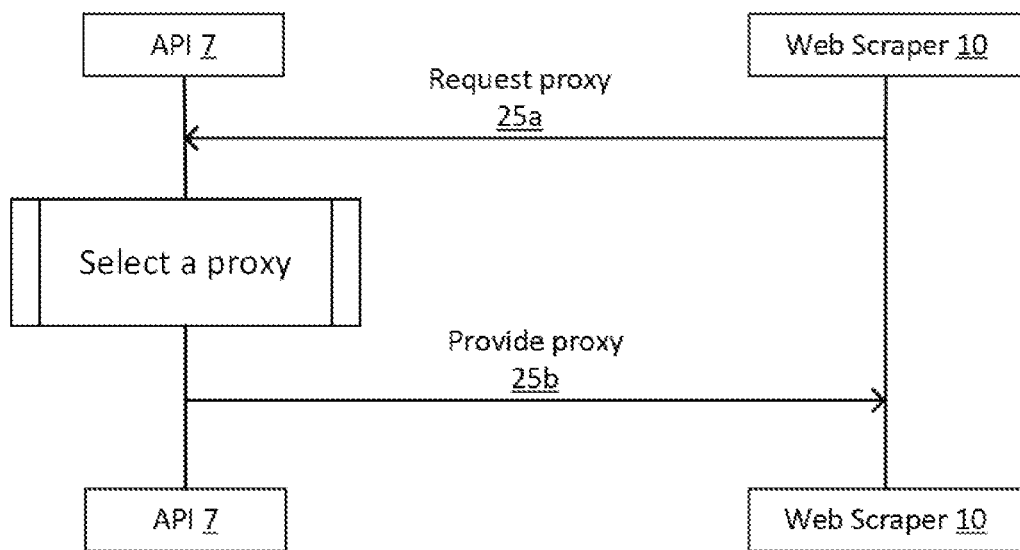
FIG. 3A is a flow diagram demonstrating the process of selecting a proxy for a client's Web scraper 10.
Figure 3B:
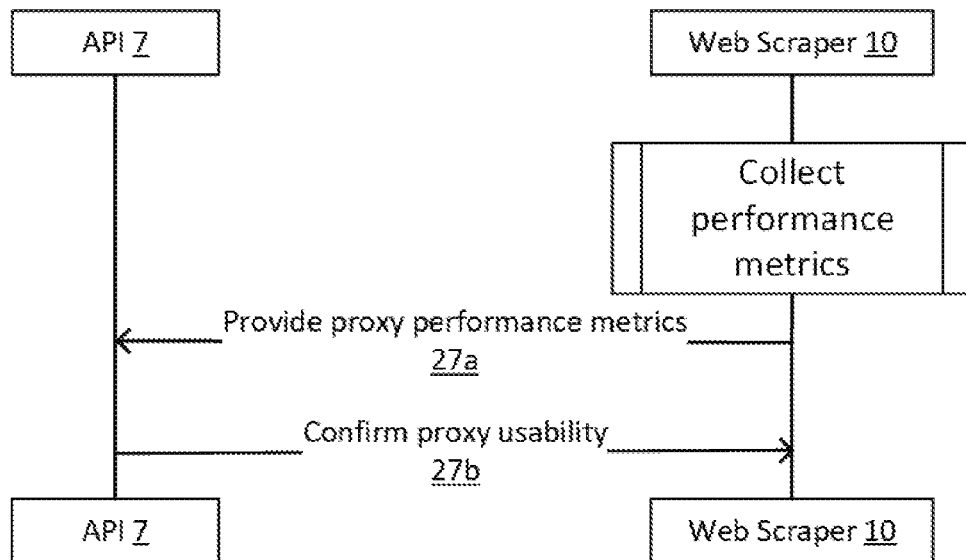
FIG. 3B is to support the method of collecting and submitting the proxy performance metrics by the Web scraper 10 to SPR 1.

In situations when a proxy provider (proxy server) gets disabled or maxes out its usage, SPR 1 can ask to stop using the proxy 11 with the parameter 'usable' set to 'False' in the feedback response (API 7, FIG. 3B). When the parameter 'usable' is set to 'True', the Web scraper 10 can keep using the proxy 11 for another request.

There can be a situation where all providers are disabled and SPR 1 is not able to allocate a proxy 11 to a Web scraper 10. In this situation, SPR 1 sends a custom error or any other notification that shows to a client or any other notification that shows to a client that there are no available proxies 11 and the suggested time when the Web scraper 10 should ask for a proxy again. This can save a number of unnecessary requests.

A separate component Checker 8 is dedicated to checking proxies that have been disabled due to connection errors and unavailability for service (step 25). Checker 8 receives information about the proxies from the Rotator engine 2 (step 29).

The mechanism of the checking (step 25) can be based at least on the following methods, but other methods might also be used, such as ICMP ping request and/or HTTP/HTTPS session attempt.

The frequency of the probing is a pre-configured setting, possibly per proxy provider. The methods listed above could technically be triggered during any selected time periods, preferably but not necessarily varying from several seconds to several minutes.

Disabling the proxy provider can also be an explicit configuration setting when: the proxy provider has a data limit configured and it has been reached; the proxy provider has a "number of sessions limit" and it has been reached; the proxy provider lacks proxies; and/or the proxy provider reached the disable date (Example Table 1, line 3).

Figure 5:
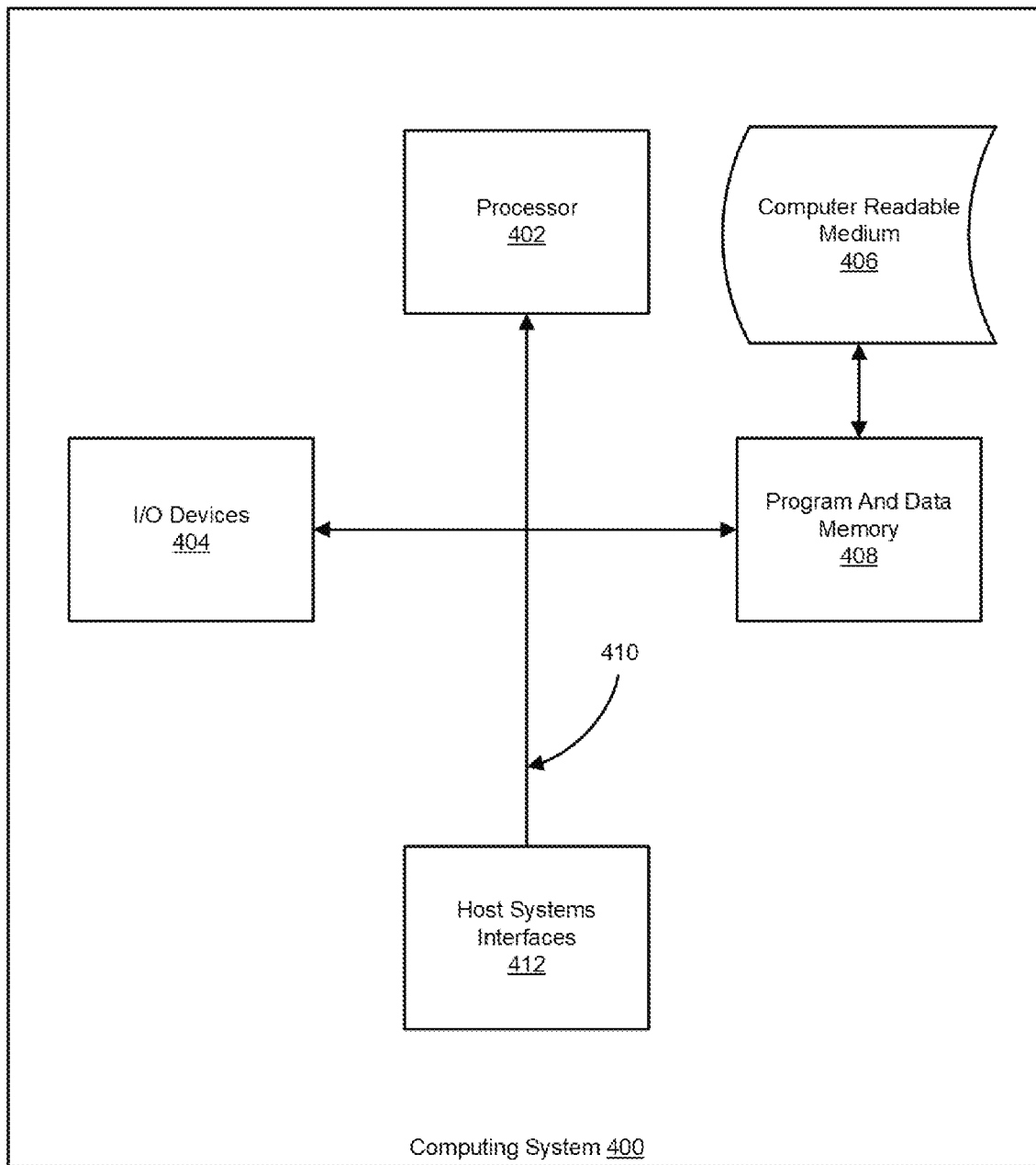
FIG. 5 is a block diagram of an exemplary computing system in which a computer readable medium provides instructions for performing methods herein.

The embodiments herein may be combined in a variety of ways as a matter of design choice. Accordingly, the features and aspects herein are not intended to be limited to any particular embodiment. Furthermore, the embodiments can take the form of hardware, firmware, software, and/or combinations thereof. In one embodiment, such software includes but is not limited to firmware, resident software, microcode, etc. FIG. 5 illustrates a computing system 400 in which a computer readable medium 406 may provide instructions for performing any of the methods and processes disclosed herein.

Furthermore, some aspects of the embodiments herein can take the form of a computer program product accessible from the computer readable medium 406 to provide program code for use by or in connection with a computer or any instruction execution system. For the purposes of this description, the computer readable medium 406 can be any apparatus that can tangibly store the program code for use by or in connection with the instruction execution system, apparatus, or device, including the computing system 400.

The computer readable medium 406 can be any tangible electronic, magnetic, optical, electromagnetic, infrared, or semiconductor system (or apparatus or device). Some examples of a computer readable medium 406 include solid state memories, magnetic tapes, removable computer diskettes, random access memories (RAM), read-only memories (ROM), magnetic disks, and optical disks. Some examples of optical disks include read only compact disks (CD-ROM), read/write compact disks (CD-R/W), and digital versatile disks (DVD).

The computing system 400 can include one or more processors 402 coupled directly or indirectly to memory 408 through a system bus 410. The memory 408 can include local memory employed during actual execution of the program code, bulk storage, and/or cache memories, which provide temporary storage of at least some of the program code in order to reduce the number of times the code is retrieved from bulk storage during execution.

Input/output (I/O) devices 404 (including but not limited to keyboards, displays, pointing devices, I/O interfaces, etc.) can be coupled to the computing system 400 either directly or through intervening I/O controllers. Network adapters may also be coupled to the computing system 400 to enable the computing system 400 to couple to other data processing systems, such as through host systems interfaces 412, printers, and/or or storage devices through intervening private or public networks. Modems, cable modems, and Ethernet cards are just examples of network adapter types.

Figure 6:
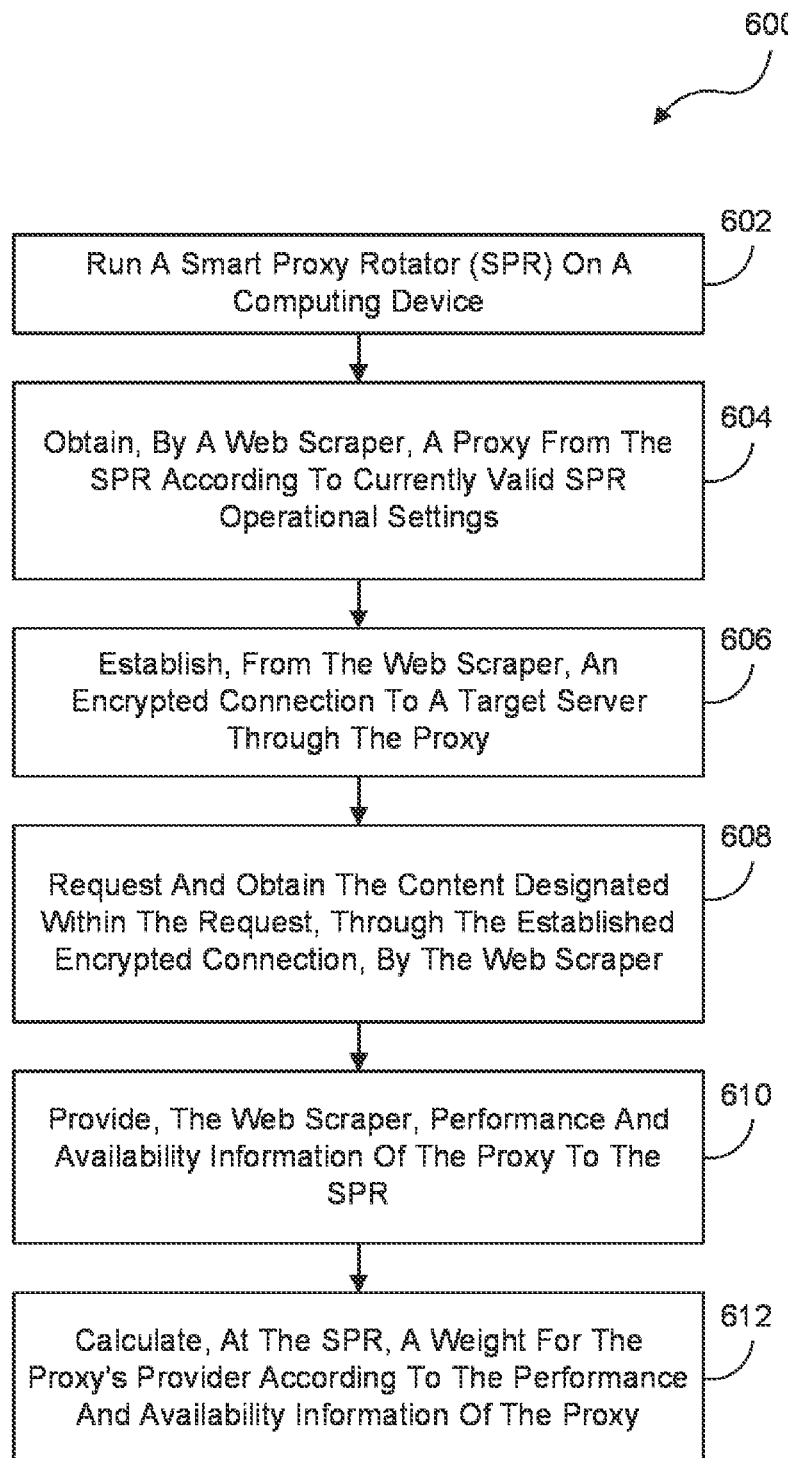
FIG. 6 is a flowchart of an exemplary method involving the present embodiments.

FIG. 6 is a flowchart of an exemplary method involving the present embodiments. As shown in FIG. 6, the method 600 involves running a smart proxy rotator (SPR) on a computing device at step 602, obtaining a proxy from the SPR by a Web Scraper according to currently valid SPR operational settings at step 604, establishing an encrypted connection from the Web Scraper to a target server through the Proxy at step 606, requesting and obtaining the content designated within the request, through the established encrypted connection, by the Web Scraper from the Target server at step 608, providing performance and availability information of the proxy to the SPR from the Web Scraper at step 610, and calculating a weight for the proxy's provider accordingly at the SPR at step 612.

Figure 7:
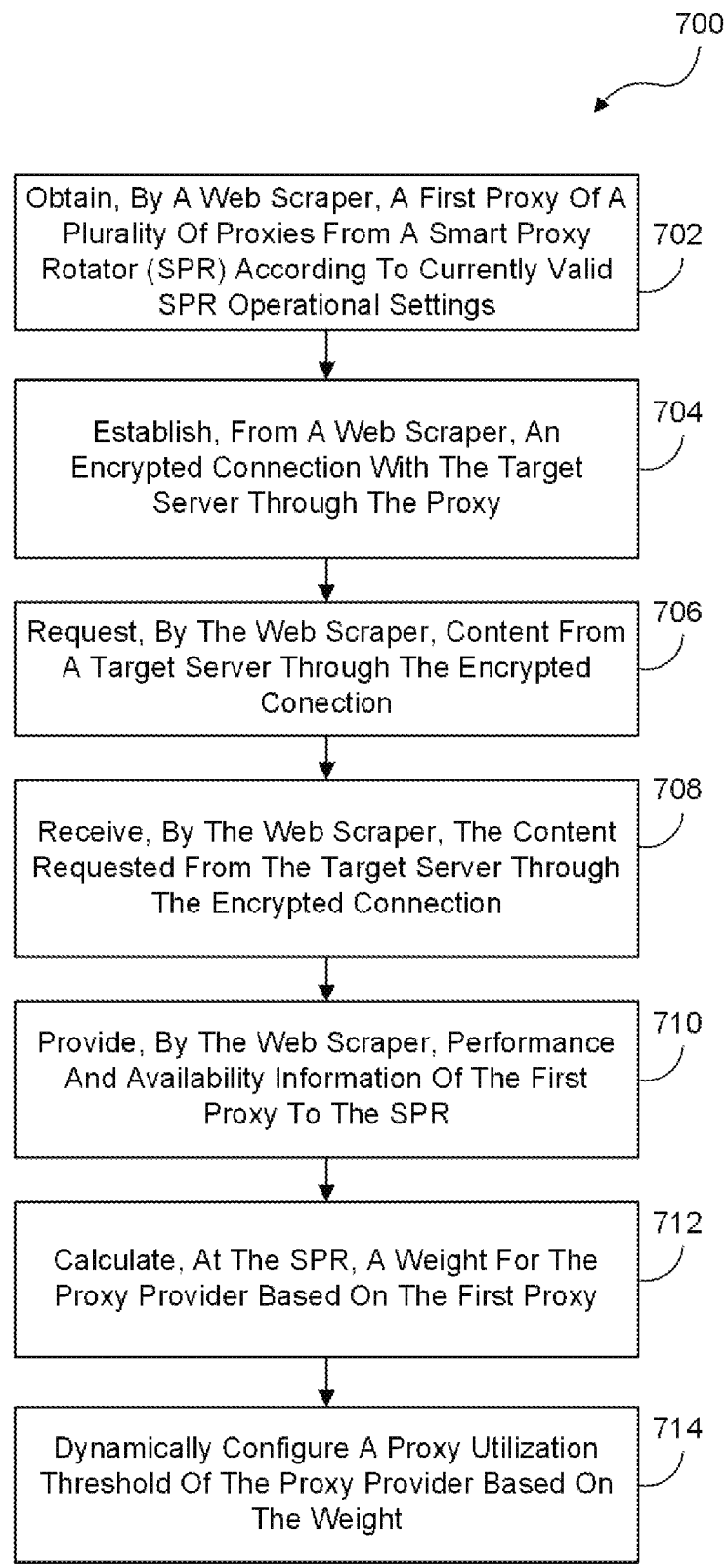
FIG. 7 is a flowchart of another exemplary method involving the present embodiments.

FIG. 7 is a flowchart of another exemplary method involving the present embodiments. As shown in FIG. 7, the method 700 involves a Web Scraper obtaining a first proxy of a plurality of proxies from a Smart Proxy Rotator (SPR) according to currently valid SPR operational settings at step 702, establishing an encrypted connection with the Target server through the first proxy at step 704, requesting content from a Target server through the established encrypted connection at step 706, receiving the content requested from the Target server through the encrypted connection at step 708, and providing performance and availability information of the first proxy to the SPR at step 710, and, at the SPR: calculating a weight for the proxy provider that the first proxy belongs to, based on the analysis of first proxy performance statistics at step 712; and dynamically configuring a proxy provider utilization threshold based on the provider's weight at step 714.

One exemplary system involving the present embodiments comprises at least one Proxy server, a smart proxy rotator (SPR) operable to provide a plurality of proxies over a network, and a Web Scraper operable to obtain a first proxy of the plurality of proxies from the SPR according to currently valid SPR operational settings, to establish an encrypted connection with the target server through the first proxy, to request and receive the content designated within the request through the encrypted connection, and to provide performance and availability information of the first proxy to the SPR, with the SPR being operable to calculate a weight for the proxy provider based on the first proxy performance, and to dynamically configure utilization threshold of the proxy provider based on the weight.

One exemplary method involving the present embodiments comprises obtaining, by a Web Scraper 10, a first proxy of a plurality of proxies from SPR 1 according to currently valid SPR 1 operational settings, establishing an encrypted connection with the Target server 12 through the first proxy, requesting content from a Target server 12 through the encrypted connection, receiving the content designated within the request through the encrypted connection, and providing performance and availability information of the first proxy to the SPR 1, and, via the SPR 1: calculating a weight for the proxy server based on the first proxy performance statistics, and dynamically configuring the proxy provider utilization threshold based on the weight calculated. The Web Scraper 10 connects to the proxy obtained from the SPR and uses the proxy to obtain the content from a Target 12. The calculation of proxy providers' weights can be done by the SPR 1 based on the evaluation of performance and availability data from at least one proxy 11 or based on the information of a plurality of proxies 11. The SPR 1 periodically, at any configured period of time, calculates and configures proxy providers' weights according to the proxy performance and availability information submitted by the Web scraper 10. In another embodiment, the Web Scraper 10 accumulates the performance and availability information from a plurality of proxies before providing the information to the SPR 1. The SPR 1 stops using a proxy provider, at least for a period of time, when at least one of the configured maximum thresholds is reached.

The performance and availability information collected by the Web Scraper 10 include, but are not limited to: proxy id, proxy status, proxy response time, and a size of data obtained through the proxy. The SPR 1 operational settings can be different and vary according to operator's needs. But the settings can be: proxy provider settings, utilization thresholds, error thresholds, and/or proxy lists. The SPR 1 operational settings are loaded into a database on disk, a flat file on disk, a database in memory, or other storage media. In different embodiments, the SPR 1 can be placed within a client's network, proxy service provider's network, or a party providing proxy rotation services.

An exemplary computer program disclosed, is for dynamically configuring a utilization threshold of proxy provider comprising instructions which, when executed by a computer device, causes the computing device to: provide a Web Scraper 10 with a proxy from a proxy providers list; accumulate performance and availability information about the proxy provided by the Web Scraper 10 after the proxy has been used to obtain content from a Target 12, wherein the content is indecipherable to a SPR 1; calculate and configure utilization thresholds of a plurality of proxy providers by evaluating the performance and availability information received from the Web Scraper 10. The computer program periodically reconfigures proxy provider's utilization threshold according to the performance and availability information provided by the Web Scraper 10.

Also, a system is disclosed comprising a SPR 1 operable to provide a plurality of proxies over a network; and a Web Scraper 10 operable to obtain a first proxy of the plurality of proxies from the SPR 1. The obtained proxy serves one request for content to a Target server 12. The encrypted connection is established with the Target server 12 through the first proxy, to receive the content designated within the request through the encrypted connection, and to provide performance and availability information of the first proxy to the SPR 1. The SPR 1 is operable to calculate a weight for the proxy provider based on the first proxy, and to dynamically configure a proxy utilization threshold of the proxy server based on the weight. The SPR is able to calculation of proxy providers' weights based on the evaluation of performance and availability data from at least one proxy or a plurality of proxies.

The various embodiments described herein provide changing the utilization threshold of proxy providers that is based at least in part upon usage history and availability of the proxies, thereby addressing shortcomings of possible overuse of the proxy provider. Client frustration will be less while ensuring the adequate use of the proxies. Rotation of proxies or proxy providers is based on dynamic updates received from the clients using different Web scraping application and not on statistic results calculated by a service person providing proxy services. The methods of the present embodiments allow the user to have available only active and ready to use proxies to perform a request.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings.

Moreover in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", 'includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments describe the use of one or more generic or specialized databases (such as "DB", "Cold DB", "Time series DB", or similar), that contains a collection of information that is organized so that it can be easily accessed, managed and updated. Computer databases typically contain aggregations of data records or files, in the current case, databases usually store different information and statistics about the proxies or proxy providers, information about utilization threshold of the proxy provider. Such databases can also contain information about the clients, requests performed, networks used, proxies used, types of proxies requested and similar data. Databases are structured to facilitate the storage, retrieval, modification, and deletion of data in conjunction with various data-processing operations.

What is claimed:

1. A computer-implemented method for dynamically configuring a utilization threshold of a proxy provider, the method comprising:
    running a smart proxy rotator (SPR) on a computing device connected to a network;
    obtaining a proxy from the SPR, according to currently valid SPR operational settings, by a Web Scraper to use for a request for content;
    establishing, by the Web Scraper, an encrypted connection to a target server through the proxy;
    requesting and obtaining the content designated within the request, through the encrypted connection, by the Web Scraper;
    providing, by the Web Scraper, performance and availability information of the proxy to the SPR;
    calculating, at the SPR, a weight for the proxy provider; and
    dynamically configuring utilization threshold of the proxy provider based on the calculation.

2. The method of claim 1, wherein the Web Scraper accumulates the performance and availability information from a plurality of proxies before providing the information to the SPR.

3. The method of claim 1, wherein proxy providers' weights are calculated by the SPR based on the evaluation of performance and availability information from at least one proxy belonging to the proxy provider.

4. The method of claim 1 further comprising dynamically configuring utilization threshold of the proxy provider based on the weight calculations.

5. The method of claim 1, wherein the SPR periodically calculates and configures the proxy provider weight according to the proxy performance and availability information submitted by the Web Scraper at any configured period of time.

6. The method of claim 1, wherein the SPR stops using a maximized proxy provider, at least for a period of time, when at least one configured maximum threshold is reached.

7. The method of claim 1, wherein the performance and availability information collected include, but are not limited to: proxy id, proxy status, proxy response time, and a size of data obtained through the proxy.

8. The method of claim 1, wherein SPR operational settings, such as proxy provider settings, utilization thresholds, error thresholds and proxy lists, are loaded into a database on disk, a flat file on disk, a database in memory, or other storage media.

9. The method of claim 1, wherein the SPR can be placed within a client's network, proxy service provider's network, or a party providing proxy rotation services.

10. A non-transitory computer readable medium computer medium for dynamically configuring a utilization threshold of a proxy provider comprising instructions which, when executed by a computing device, causes the computing device to:

provide a Web Scraper with a proxy from a proxy provider list;

accumulate performance and availability information about the proxy provided by the Web Scraper after the proxy has been used to obtain content from a target, wherein the content is unreadable to a Smart Proxy Rotator (SPR) due to network transport layer or application layer encryption;

calculate and configure utilization thresholds of a plurality of proxy providers by evaluating proxy performance and availability information received from the Web Scraper.

11. The non-transitory computer-readable medium of claim 10, wherein the proxy provider's utilization threshold is periodically reconfigured according to the performance and availability information provided by the Web Scraper.

12. The non-transitory computer-readable medium of claim 10, wherein proxy providers' weights are periodically calculated and configured according to the proxy performance and availability information submitted by the Web Scraper at any configured period of time.

13. The non-transitory computer-readable medium of claim 10, wherein usage of the proxy provider is placed on hold, at least for a period of time, when at least one configured maximum threshold is reached.

14. The non-transitory computer-readable medium of claim 10, wherein the performance and availability information collected include, but are not limited to: proxy id, proxy status, proxy response time, and a size of data obtained through the proxy.

15. The non-transitory computer-readable medium of claim 10, wherein operational settings, such as proxy provider settings, utilization thresholds, error thresholds and proxy lists, are loaded into a database on disk, a flat file on disk, a database in memory, or other storage media.

16. The non-transitory computer-readable medium of claim 10, wherein the computing device executing the program can be placed within a client's network, proxy service provider's network, or any other network.

17. A system comprising:

a Smart Proxy Rotator (SPR) operable to provide a plurality of proxies over a network; and a Web Scraper operable to obtain a first proxy of the plurality of proxies from the SPR according to currently valid SPR operational settings, to establish an encrypted connection with the target server through the first proxy, to request content from a target server, to receive the content designated within the request through the encrypted connection, and to provide performance and availability information of the first proxy to the SPR, wherein the SPR is operable to calculate a weight for the proxy provider of the first proxy based on first proxy performance statistics analysis, and to dynamically configure utilization threshold of the proxy provider based on the weight calculated.

18. The system of claim 17, wherein proxy providers' weights are calculated by the SPR based on the evaluation of performance and availability information from at least one proxy belonging to the provider.

19. The system of claim 17, wherein the SPR periodically, at any configured period of time, calculates and configures proxy providers' weights according to the proxy performance and availability information submitted by the Web Scraper.

20. The system of claim 17, wherein the SPR stops using a maximized proxy provider, at least for a period of time, when at least one configured maximum threshold is reached.

* * * * *

EX PARTE REEXAMINATION CERTIFICATE (12668th)

United States Patent
Juravicius et al.

(10) Number: US 10,601,948 C1
(45) Certificate Issued: Aug. 6, 2024

(54) SMART PROXY ROTATOR

(71) Applicant: metacluster lt, UAB, Vilnius (LT)

(72) Inventors: Martynas Juravicius, N. Utos eldership (LT); Eivydas Vilcinskas, Siauliai (LT)

(73) Assignee: OXYLABS, UAB

Reexamination Request:
No. 90/015,289, Aug. 31, 2023

Reexamination Certificate for:
Patent No.: 10,601,948
Issued: Mar. 24, 2020
Appl. No.: 16/669,149
Filed: Oct. 30, 2019

(51) Int. Cl.
G06F 15/173 (2006.01)
H04L 9/40 (2022.01)
H04L 12/24 (2006.01)
H04L 29/06 (2006.01)
H04L 29/08 (2006.01)
H04L 41/14 (2022.01)
H04L 41/5009 (2022.01)
H04L 43/0823 (2022.01)
H04L 67/02 (2022.01)
H04L 67/141 (2022.01)
H04L 67/288 (2022.01)

(52) U.S. Cl.
CPC ............ H04L 67/288 (2013.01); H04L 41/14 (2013.01); H04L 41/5016 (2013.01); H04L 43/0823 (2013.01); H04L 63/0272 (2013.01); H04L 63/0281 (2013.01); H04L 63/0428 (2013.01); H04L 67/02 (2013.01); H04L 67/141 (2013.01)

(58) Field of Classification Search
None
See application file for complete search history.

(56) References Cited

To view the complete listing of prior art documents cited during the proceeding for Reexamination Control Number 90/015,289, please refer to the USPTO's Patent Electronic System.

*Primary Examiner* — Adam L Basehoar

(57) ABSTRACT

The task, logic of HTTP/HTTPS session statistics interception and collection is moved to the client side instead of the proxy layer. Encrypted HTTPS tunnel is terminated at the client end, making the actual content or data in transit invisible to both proxies and the smart proxy rotator (SPR). Client's scraping software has a plug-in installed that expands its functionality. HTTP/HTTPS session quality metrics are intercepted and collected at the client side, then sent to the SPR. Proxy usage mark "can be used" is obtained from the SPR for the currently analyzed proxy, based on the results of metrics analysis.

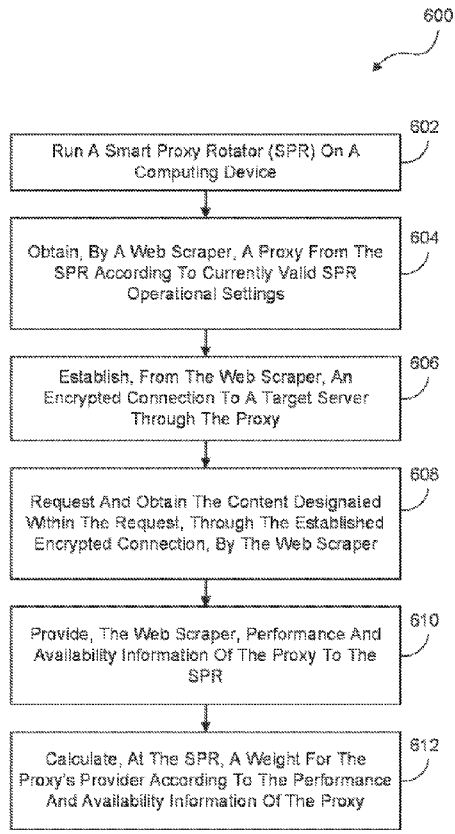

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-20 is confirmed.

\* \* \* \* \*